US012775720B2

(12) United States Patent
Narayan et al.

(10) Patent No.: US 12,775,720 B2
(45) Date of Patent: *Oct. 27, 2026

(54) AUTO GENERATING BUILD TIME POLICIES FROM RUN TIME POLICIES FOR SHIFT LEFT SECURITY

(71) Applicant: Palo Alto Networks, Inc., Santa Clara, CA (US)

(72) Inventors: Krishnan Shankar Narayan, San Jose, CA (US); Srikumar Narayan Chari, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/067,270

(22) Filed: Feb. 28, 2025

(65) Prior Publication Data

US 2025/0200196 A1 Jun. 19, 2025

Related U.S. Application Data

(63) Continuation of application No. 17/646,691, filed on Dec. 31, 2021, now Pat. No. 12,248,586.

(51) Int. Cl.
*G06F 17/00* (2019.01)
*G06F 21/60* (2013.01)

(52) U.S. Cl.
CPC .................................. *G06F 21/604* (2013.01)

(58) Field of Classification Search
CPC ..................................................... G06F 21/604
See application file for complete search history.

(56) References Cited

U.S. PATENT DOCUMENTS 10,791,021 B1 9/2020 Sharma
12,248,586 B2 * 3/2025 Narayan .............. G06F 21/604
2014/0379673 A1 12/2014 Lim (Continued)

OTHER PUBLICATIONS

Tasnia H. Ashrafi et al., FOG based distributed IoT infrastructure. In Proceedings of the Second International Conference on Internet of things, Data and Cloud Computing. Association for Computing Machinery, Article 124, 1-13. <https://doi.org/10.1145/3018896.3036365>, March (Year: 2017).*

(Continued)

*Primary Examiner* — Greta L Robinson
(74) *Attorney, Agent, or Firm* — Gilliam IP PLLC

(57) ABSTRACT

Comprehensive matching allows for automated conversion from runtime policy rules to build time rules that can be applied to an IaC configuration file(s). API specifications of a CSP and resource models defined in an IaC configuration file(s) are parsed and tokenized. The tokenized API specifications are evaluated to identify, for each resource model, a most appropriate API specification for mapping fields. Based on the evaluation and token matching, tokens of the API specifications are mapped to the tokens of the IaC resource models to form a mapping model. In an implementation phase, a runtime policy rule converter replaces tokens of a runtime security policy rule query with IaC tokens based on the mapping index to convert the runtime security policy rule query into a buildtime security policy rule query that can be applied against the IaC configuration files.

20 Claims, 7 Drawing Sheets

(56) References Cited

U.S. PATENT DOCUMENTS

| | | | |
|---|---|---|---|
| 2020/0183739 | A1 | 6/2020 | Hashimoto et al. |
| 2020/0328941 | A1 | 10/2020 | Feiguine et al. |
| 2021/0089627 | A1 | 3/2021 | Kumar et al. |

OTHER PUBLICATIONS

Duplyakin, et al., "Highly Available Cloud-Based Cluster Management", In Proceedings of the 15th IEEE/ACM International Symposium on Cluster, Cloud and Grid Computing (CCGRID '15), IEEE Press, pp. 1201-1204, May 2015, DOI: 10.1109/CCGrid.2015.125.

Gonzalez, et al., "Barriers to Shift-Left Security: The Unique Pain Points of Writing Automated Tests Involving Security Controls", ESEM '21: Proceedings of the 15th ACM / IEEE International Symposium on Empirical Software Engineering and Measurement (ESEM), Oct. 2021, Article No. 11, 12 pages.

Nedeltcheva, et al., "Towards Supporting the Generation of Infrastructure as Code Through Modelling Approaches—Systematic Literature Review", Retrieved online from <https://www.researchgate.net/publication/358277637_Towards_Supporting_the_Generation_of_Infrastructure_as_Code_Through_Modelling_Approaches_-_Systematic_Literature_Review> on Feb. 11, 2022, 8 pages.

Sandobalin, et al., "On the Effectiveness of Tools to Support Infrastructure as Code: Model-Driven Versus Code-Centric", In IEEE Access, vol. 8, 2020, doi: 10.1109/ACCESS.2020.2966597., Jan. 14, 2020, 28 pages.

* cited by examiner

AUTO GENERATING BUILD TIME POLICIES FROM RUN TIME POLICIES FOR SHIFT LEFT SECURITY

BACKGROUND

This disclosure generally relates to data processing and to database and file access.

Shift left is a software design approach that introduces abstractions into the software development cycle allowing for testing to occur earlier in the development timeline. Shift left bridges the gap between development and information technology operations in DevOps practices. Testing is introduced at an earlier stage than unit testing of deployed code and can be used to validate software designs, system requirements, etc. before any code is written.

Infrastructure as code (IaC) is a methodology for managing data resources using configuration files. IaC has the capability of automatically mapping and deploying cloud resources based on user-defined configuration of resources as specified in configuration files. IaC tools such as the Terraform® IaC tool enable the automated process of mapping and deploying these resources by interpreting configuration files. IaC allows operations teams to work with developers earlier in the development cycle to promote best practices for both development and operations in tandem.

BRIEF DESCRIPTION OF THE DRAWINGS

Embodiments of the disclosure may be better understood by referencing the accompanying drawings.

DESCRIPTION

Figure 1:
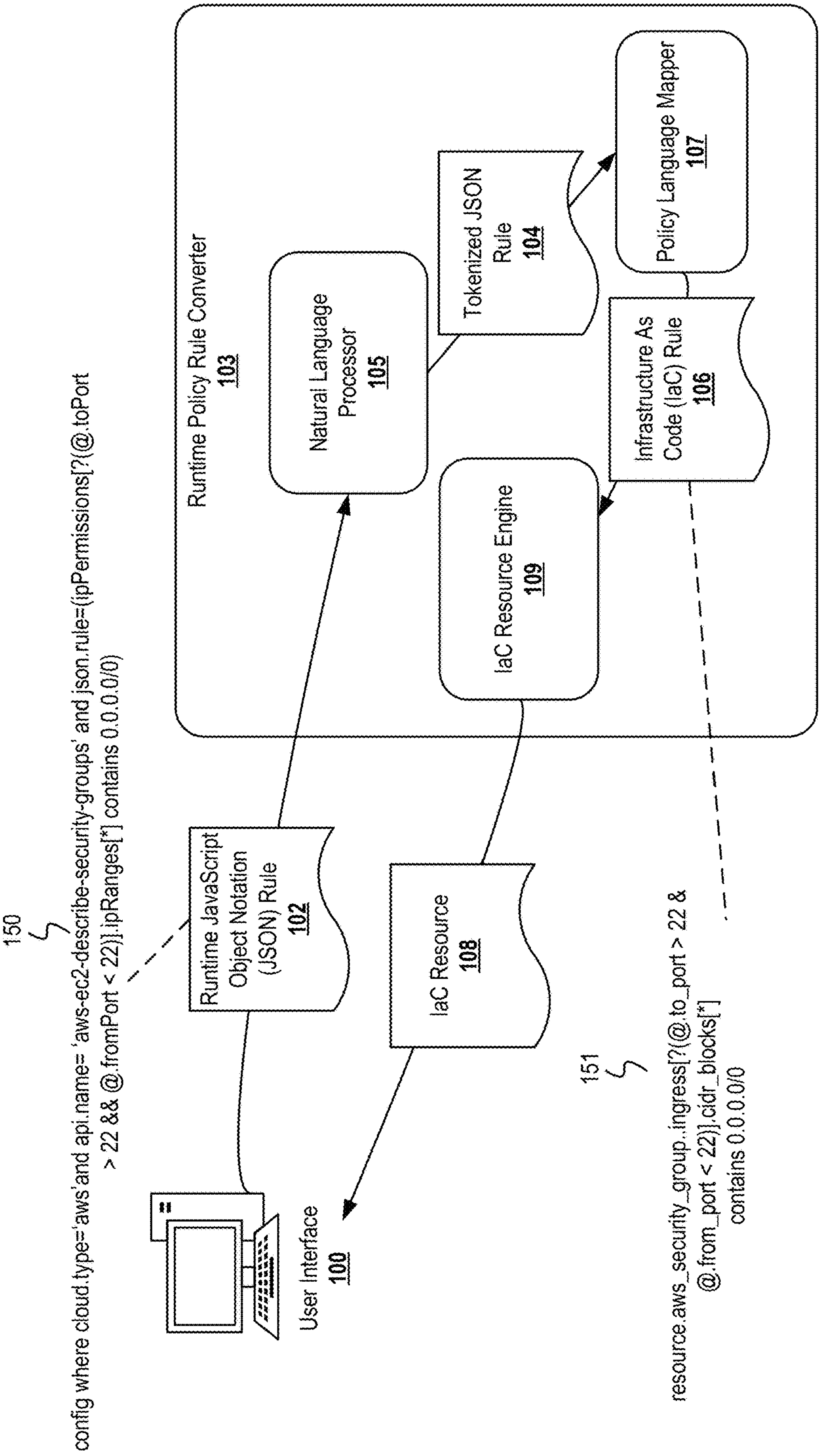
FIG. 1 is a schematic diagram of an example system for converting runtime JavaScript Object Notation (JSON) rules into IaC templates.

The description that follows includes example systems, methods, techniques, and program flows that embody aspects of the disclosure. However, it is understood that this disclosure may be practiced without these specific details. For instance, this disclosure refers to converting JavaScript Object Notation (JSON) rules according to a resource query language configured to query cloud service provider (CSP) application programming interfaces (APIs) into IaC resources in illustrative examples. Aspects of this disclosure can be also applied to converting syntax for any security policy rule into IaC resources for any IaC tool. In other instances, well-known instruction instances, protocols, structures and techniques have not been shown in detail in order not to obfuscate the description.

Overview

Introduction of IaC abstractions into the lifecycle of allocating and deploying cloud resources results in inconsistencies between IaC schemas and CSP API calls that define security policies. Conversion from a policy rule for a CSP API to a corresponding IaC resource can involve manually matching an index of tokens in CSP security rules to tokens of IaC resources based on their respective functionalities. A comprehensive matching index disclosed herein allows for automated conversion from runtime policy rules (e.g., JSON rules to be applied to code that makes CSP API calls) to build time rules that can be applied to an IaC configuration file(s). In a first phase, API specifications of a CSP and resource models defined in an IaC configuration file(s) are parsed and tokenized. The tokenized API specifications are evaluated to identify, for each resource model, a most appropriate API specification for mapping fields. Evaluation of the API tokenized specifications is against a heuristic(s). For instance, a heuristic may specify that a most appropriate API specification for a resource model will satisfy a token matching criterion. Based on the evaluation and token matching, fields of the API specifications are mapped to the fields of the IaC resource models to form a mapping model. In an implementation phase, a runtime policy rule converter extracts tokens from JSON rules for CSP security policies, converts the tokens into corresponding tokens for IaC resources, then plugs the tokens into the runtime policy rule to convert it into a buildtime policy rule. The matching index between tokens in CSP security policies and tokens in IaC resources saves the manual cost of matching index JSON rules to IaC resources every time a new security policy is implemented and increases fidelity between policies generated by a user (i.e., CSP security policies) and policies generated earlier in the development cycle when allocating resources via IaC.

Terminology

An "IaC resource" refers to any resource managed by IaC via a configuration file/template. Resource can include program modules, program functions, physical memory, virtual machines, security policies, cloud resources, etc. The dependencies and scope of each resource are defined by a section of a template according to an API for the corresponding IaC tool. Resources can be updated and monitored for best practices and security policy consistency using version control via the IaC tool.

A "runtime policy rule" refers to a security policy rule in a syntax configured to execute in a runtime environment. For instance, the runtime policy rule can be a rule for a resource query language (RQL) expressed as a JSON rule. The JSON rule can define a security policy rule for resources hosted by a CSP, and an RQL engine can convert the RQL rule to queries according to the CSP API.

As used herein, the term "or" is inclusive unless otherwise explicitly noted. Thus, the phrase "at least one of A, B, or C" is satisfied by any element from the set {A, B, C} or any combination thereof, including multiples of any element.

Example Illustrations

FIG. 1 is a schematic diagram of an example system for converting runtime JSON rules into IaC templates. A runtime policy rule converter 103 receives a runtime JSON rule 102 via user interface 100 and generates a corresponding IaC resource 108. The runtime policy rule converter 103 comprises a natural language processor 105 that tokenizes the runtime JSON rule 102 into a tokenized JSON rule 104. A policy language mapper 107 uses a stored matching index from JSON rule tokens to IaC rule tokens to generate an IaC rule 106. An IaC resource engine 109 converts the IaC rule 106 into the IaC resource 108. The user interface 100 receives the resulting IaC resource 108 for presentation/display and subsequent execution.

Prior or in parallel to conversion of runtime JSON rules into IaC resources as depicted in FIG. 1, a resource planner (not depicted) generates configuration files that map IaC resources. An IaC tool can generate a resource graph for the configuration files and can display a visualization of the resource graph to the user interface 100 for user verification. The IaC tool allows for version control and continuous updates to the configuration files based on added/deleted resources, security policies (e.g., as defined by the runtime JSON rule 102), etc. via the user interface 100.

The runtime JSON rule 102 comprises a JSON rule for a security policy having a syntax that is according to a resource query language (RQL) that is subsequently converted to queries to a cloud service provider using an RQL engine (not depicted). The security policy can comprise ranges for Internet Protocol (IP) addresses, ranges for to- and from ports, types and/or configurations for allowed buckets, etc. The runtime JSON rule 102 is specified as a runtime policy rule because it can be added during implementation and utilization of resources in a cloud as a rule and used to generate API calls to the CSP. Alternatively, the runtime JSON rule 102 can be any security policy rule that is formatted in a syntax that can be parsed and executed by a program during the runtime of the program lifecycle. For instance, a security policy can be dynamically updated during the runtime of a program based on recently detected threats, user inputs, etc. For the case of CSPs, the security policy is implemented as runtime rules according to the API used by the RQL whereas using an IaC tool allows for matching index and allocating resources managed by the CSP prior to runtime, enabling consistency between the allocation of resources and the security policy rules. Without the translation from runtime JSON rules to IaC resources depicted in FIG. 1, security policy rules can be inconsistent and/or incorrect for runtime allocation of CSP resources resulting in security vulnerabilities.

An example runtime JSON rule 150 is the following:

config where cloud.type='aws'and api.name='aws-ec2-describe-security-groups' AND json.rule=(ipPermissions[?(@.toPort>22 && @.fromPort<22)].ipRanges [*] contains 0.0.0.0/0)

This rule is for the Amazon Web Services® cloud computing service (aws) as indicated in the "cloud.type" field and follows the API for security groups of the AWS Elastic Compute Cloud® (ec2) service as indicated in the "api.name" field. The security group API specifies firewall rules for ec2 instances hosted by aws. The "ipPermissions [ . . . ]" syntax clarifies ports, protocols, ranges, etc. that are acceptable according to the security rule. For the example runtime JSON rule 150, the rule is applied to (outgoing) ports having identifiers above 22, and from (incoming) ports having identifiers below 22 as indicated by the "?(@ . . . )" syntax. For instances within these ranges of ports, the example runtime JSON rule 150 specifies that the IP address 0.0.0.0/0 is blocked.

The natural language processor 105 extracts tokens from the runtime JSON rule 102 to generate the tokenized JSON rule 104. The natural language processor 105 can be configured to identify API syntax for the runtime JSON rule 102 such as the "config where cloud.type=", "and api.name=", and "and json.rule=" commands. Based on the identified API syntax, the natural language processor can tokenize the remaining fields by removing punctuation and non-alphanumeric ranges of American Standard Code for Information Interchange (ASCII) characters. The natural language processor 105 can maintain removed punctuation/syntax as a template to be used for translating the tokenized JSON rule 104 to the IaC rule 106. The policy language mapper 107 converts the tokenized JSON rule 104 to the IaC rule using a stored matching index between IaC rule tokens and JSON rule tokens as well as a stored matching index between template syntax for JSON rules and template syntax for IaC rules. An example IaC rule 151 is the following:

resource.aws_security_group . . . ingress[?(@.to_port>22 & @.from port<22)].cidr_blocks[*] contains 0.0.0.0/0

The policy language mapper 107 uses the tokens "aws" and "aws-ec2-describe-security-groups" to generate the template "resource.aws_security_group" corresponding to the identified CSP and API. The matching index between JSON rule tokens and IaC rule tokens for this example is the following:

| JSON Rule Token | IaC Rule Token |
|---|---|
| ipPermissions | . . . ingress |
| toPort | to_port |
| fromPort | from_port |
| ipRanges | cidr_blocks |

The policy language mapper 107 is configured to identify fields for JSON and IaC rules as indicated by left and right brackets in the given examples, and identically copies the given fields in each set of brackets. In this instance, the logical operator contained in the argument field for respective ipPermissions and ingress functions is identical "?(@ . . . &&@ . . . )". Depending on the language used to parse the runtime JSON rule 102, logical operations can vary in syntax and functions can be parsed and translated according to distinct rules. For instance, function arguments can be indicated by left and right braces instead of left and right brackets. The policy language mapper can comprise a stored matching index between syntax for the runtime JSON rule 102 and the IaC rule 106 according to respective APIs, in this case between "config where cloud.type='aws'and api.name='aws-ec2-describe-security-groups' and json.rule=" and "resource.aws_security_group".

The IaC resource engine 109 generates the IaC resource 108 that comprises a configuration file for a resource in a corresponding IaC tool. The use of the term "resource" is flexible and refers to a resource as in the context of a representational state transfer (RESTful) API, wherein a resource is an object with associated data and relationships with other resources. The IaC resource 108 comprises security policy rules defined in, for instance, JSON files for a security policy of other resources. The IaC resource engine 109 uses the IaC rule 106 to generate the corresponding JSON file specifying the configuration for the IaC resource 108. The runtime policy rule converter 103 creates or updates a configuration file that indicates the IaC resource 108. This configuration file allows the user interface 100 to access the IaC resource 108 (e.g., view). Thereafter, a user can implement the IaC resource 108 after manual inspection or the IaC resource 108 can be automatically implemented as part of IaC resource allocation.

Figure 2:
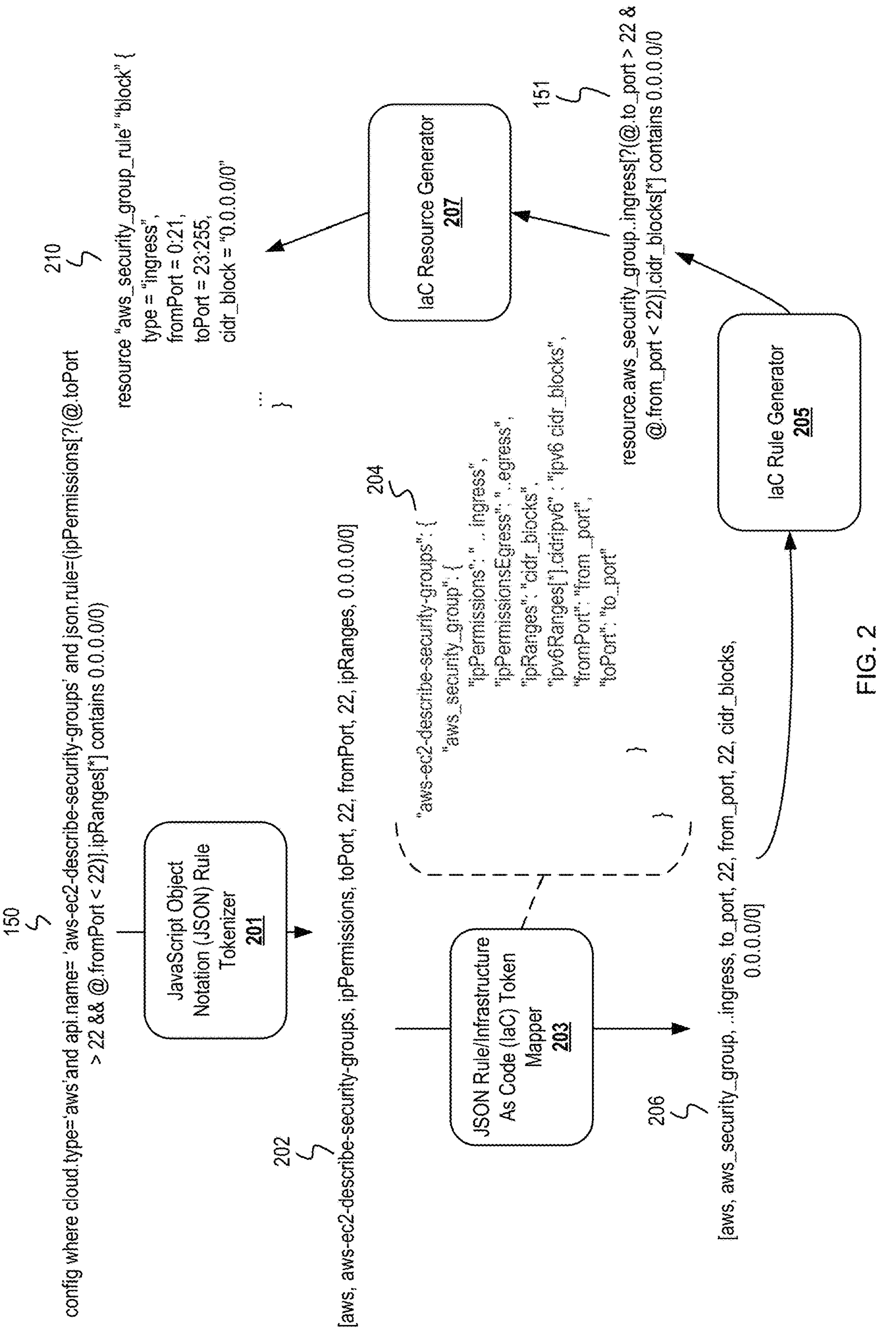
FIG. 2 is a schematic diagram of an example system for converting runtime JSON rules to IaC resources.

FIG. 2 is a schematic diagram of an example system for converting runtime JSON rules to IaC resources. A JSON rule tokenizer 201 receives the following example runtime JSON rule 150:

config where cloud.type='aws'and api.name='aws-ec2-describe-security-groups' and json.rule=(ipPermissions [?(@.toPort>22 && @.fromPort<22)].ipRanges[*] contains 0.0.0.0/0)

The JSON rule tokenizer 201 removes specified ASCII characters (e.g., non-alphanumeric characters) and extracts consecutive characters or strings of remaining characters between removed characters to generate example JSON rule tokens 202:

[aws, aws-ec2-describe-security-groups, ipPermissions, toPort, 22, fromPort, 22, ipRanges, 0.0.0.0/0]

The JSON rule tokenizer 201 can be configured to detect predefined formats of tokens such as IP addresses without removing punctuation therein.

A JSON rule/IaC token mapper 203 comprises an example JSON rule/IaC token matching index 204:

```
"aws-ec2-describe-security-groups": {
  "aws_security_group": {
    "ipPermissions": " .. ingress",
    "ipPermissionsEgress": "..egress",
    "ipRanges": "cidr_blocks",
    "ipv6Ranges[*].cidripv6" : "ipv6 cidr_blocks",
    "fromPort": "from _port",
    "toPort": "to_port"
  }
}
```

The example JSON rule/IaC token matching index 204 comprises a JSON file specifying the mapped token pairs (i.e., attribute/value pairs) between runtime JSON rules and IaC resources comprising aws security groups for ec2. The JSON rule/IaC token mapper 203 maps the example JSON rule tokens 202 to example IaC tokens 206:

[aws, aws_security_group, . . . ingress, to_port, 22, from_port, 22, cidr_blocks, 0.0.0.0/0] The JSON rule/IaC token mapper 203 can determine that the tokens "22", "22", and "0.0.0.0/0" are not contained in any stored matching index for aws ec2 security groups and can map these tokens identically. In some embodiments, the JSON rule/IaC token mapper 203 determines that the tokens not found in a stored matching index for aws ec2 security groups are approved token formats such as numbers, IP addresses, etc. Thus, a conditional mapping rule can be defined based on format of a token. The JSON rule/IaC token mapper 203 can comprise multiple matching indices of JSON files between multiple types of JSON rules and multiple types of IaC configurations.

An IaC rule generator 205 receives the example IaC tokens 206 and generates an example IaC rule 151:

resource.aws_security_group . . . ingress[?(@.to_port>22 & @.from port<22)].cidr_blocks[*] contains 0.0.0.0/0

The IaC rule generator 205 converts the preamble "config where cloud.type='aws'and api.name='aws-ec2-describe-security-groups' and json.rule=" contained in the example JSON rule to "resource.aws_security_group" based on the type of IaC configuration. The IaC rule generator 205 further replaces JSON rule tokens with IaC rule tokens while maintaining corresponding syntax. In this example, ipPermissions and ipRanges maintain left and right bracket syntax when converted to . . . ingress and cidr_blocks, and the logical "?(@ . . . &@ . . . )" syntax inside of the ipPermissions brackets is maintained inside of the . . . ingress brackets. In other embodiments for different JSON rule types and different IaC configuration types, logical and/or otherwise syntax can be converted by the IaC rule generator 205.

An IaC resource generator 207 converts the example IaC rule 151 to an example IaC resource 210:

```
resource "aws_security_group_rule" "block" {
  type = "ingress",
  toPort = 0:21,
  fromPort = 23:255,
  cidr_block = "0.0.0.0/0"
...
}
```

The IaC resource generator 207 is configured with a mapping between syntax for IaC rules and IaC resources. For instance, the IaC resource generator 207 has a stored format for the "resource.aws_security_group" in the example IaC rule 151 as the JSON file format "resource "aws_security_group_rule" "block" { . . . }" appearing in the example IaC resource 210. The IaC resource generator 207 can determine that function calls in the example IaC rule 151 correspond to attribute/value pairs in the example IaC resource 210 wherein the attributes are function calls and the values are arguments in the functions. In this instance, the IaC resource generator 207 determines that "to_port>22" in the example IaC rule 151 corresponds to the range 23-255 of ports, and that "from_port<22" corresponds to the range 0-21 of ports.

Figure 3:
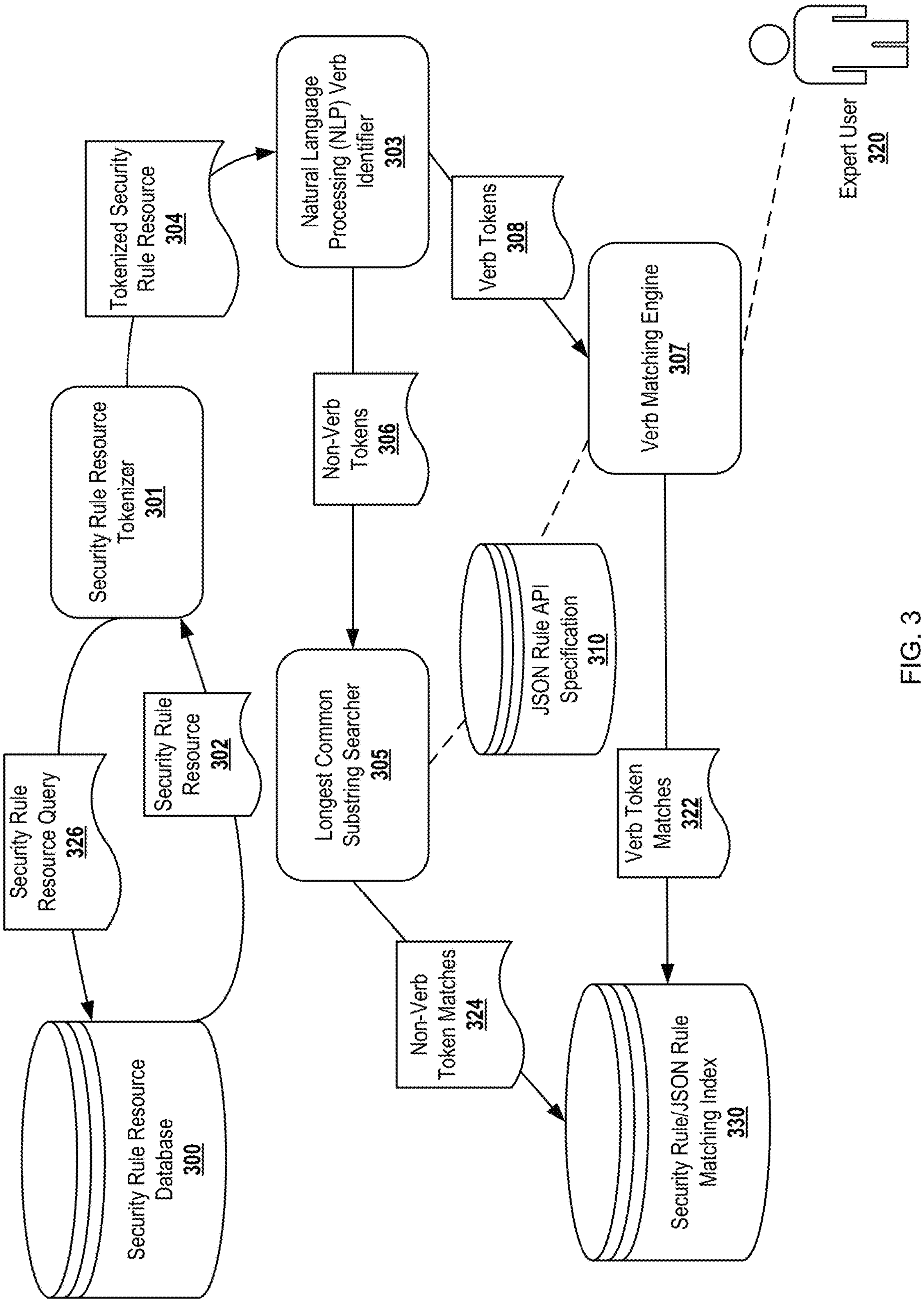
FIG. 3 is a schematic diagram of an example system for generating a security rule/JSON rule matching index.

FIG. 3 is a schematic diagram of an example system for generating a security rule/JSON rule matching index. A security rule resource tokenizer 301 communicates a security rule resource query 326 to a security rule resource database 300. The security rule resource database 300 returns a security rule resource 302 corresponding to the query. The security rule resource database 300 comprises a JSON file that specifies a security rule for an API. For instance, the security rule resource database 300 can comprise ranges of allowed IP addresses and/or port numbers for ec2 instances in the AWS cloud service. A security rule resource tokenizer 301 extracts tokens from the security rule resource 302. For instance, the security rule resource tokenizer 301 can remove space, tabs, line breaks, and bracket characters from a JSON file for the security rule resource 302 and can generate a vector of all strings between these disallowed ASCII characters to generate the tokenized security rule resource 304.

A natural language processing (NLP) verb identifier 303 receives the tokenized security rule resource 304 and determines non-verb tokens 306 and verb tokens 308. The NLP verb identifier 303 can determine the non-verb tokens 306 and verb tokens 308 using any standard part of speech tagging methods including hidden Markov models, as an example. In some embodiments, the NLP verb identifier 303 communicates tokens in the tokenized security rule resource 304 to a security rule/JSON rule matching index 330 to determine whether any of the tokens have already been matched and can remove tokens that are already present in the security rule/JSON rule matching index 330. The NLP verb identifier 303 communicates the verb tokens 308 to a verb matching engine 307 and communicates the non-verb tokens 306 to a longest common substring searcher 305.

The verb matching engine 307 searches a JSON rule API specification 310 for exact or approximate matches for the verb tokens 308. For approximate matching, the verb matching engine 307 can embed the verb tokens 308 and tokens from the JSON rule API specification 310 using word2Vec and can determine matches for the verb tokens 308 that are below a threshold distance. The threshold distance can be determined by an expert user 320 or automatically by analyzing previously determined verb matches. The JSON rule API specification 310 can include a search functionality for exact matching as well as a functionality that returns all strings for functions in the API for approximate matching. For verbs in the verb tokens 308 with no exact and/or approximate matches, an expert user 320 can manually inspect these verbs as well as the JSON rule API specification 310 to determine matches based on domain-level knowledge of which functions for the JSON rule API specification 310 correspond to which tokens in the verb tokens 308. In some instances when no match is present, verbs are dropped from the verb token matches 322.

The longest common substring searcher 305 receives the non-verb tokens 306 and performs a longest common substring search between substrings of non-verbs in the non-verb tokens and the JSON rule API specification 310. The JSON rule API specification can include a search functionality for searching substrings.

The security rule/JSON rule matching index 330 receives to store the non-verb token matches 324 and the verb token matches 322. The security rule/JSON rule matching index 330 can further store indicators that pair matching security rules and JSON rules as well as pointers to placement in the JSON rule API specification and a specification for the security rule resources for corresponding functions, arguments, etc.

Figure 4:
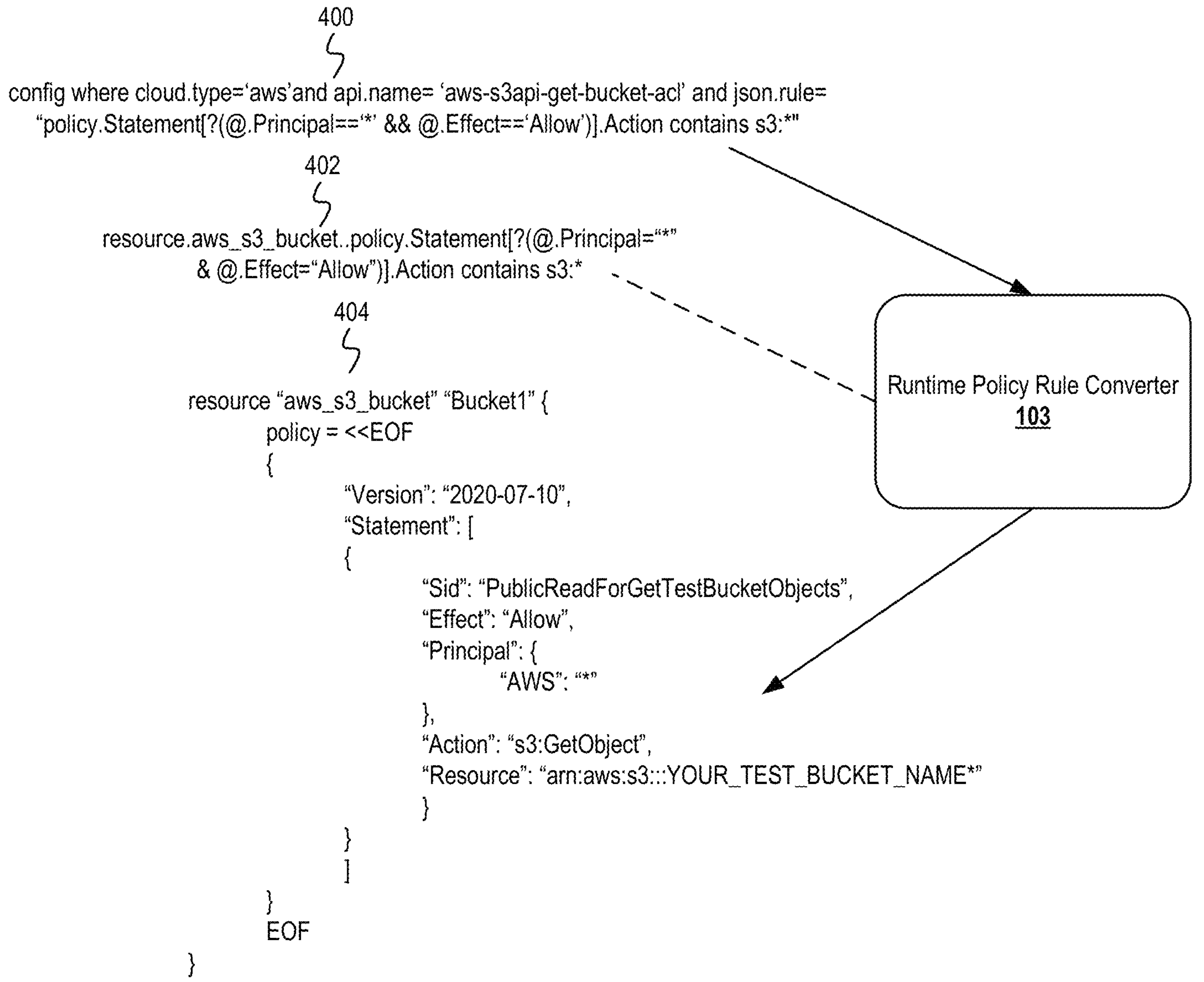
FIG. 4 depicts an example runtime JSON security rule to IaC resource conversion.

FIG. 4 depicts an example runtime JSON security rule to IaC resource conversion. The runtime policy converter 103 receives an example runtime JSON rule 400:

config where cloud.type='aws' and api.name='aws-s3api-get-bucket-acl' and json.rule="policy. Statement[?(@.Principal=='*'&& @.Effect=='Allow')]. Action contains s3:*" The example runtime JSON rule 400 is for the AWS® Simple Cloud Storage (S3) API. The rule has scope of all AWS instances (@.Principal=='*') and has the effect of allowing the specified action. The allowed actions are any actions for S3 instances (Action contains s3:*). The security policy is therefore an access policy for all S3 instances.

During conversion to an IaC resource, the runtime policy rule converter 103 generates an example IaC rule 402:

resource.aws_s3_bucket . . . policy.Statement[?(@.Principal="*"& @.Effect="Allow")].Action contains s3:*

The runtime policy rule converter 103 tokenizes the example runtime JSON rule 400. After replacing tokens in the example runtime JSON rule 400 with IaC rule tokens, based on corresponding syntax for IaC resource tokens as specified in a specification for the IaC resources, for example, the runtime policy rule convert 103 converts the syntax of the example runtime JSON rule 400 into IaC rule syntax. In the example IaC rule 402, the logical operator "&&" is replaced in syntax with the logical operator "&" and the logical operator "==" is replaced in syntax with the logical operator "=".

The runtime policy rule converter 103 subsequently converts the example IaC rule 402 into an example IaC resource 404:

```
resource "aws_s3_bucket" "Bucket1" {
  policy = <<EOF
  {
    "Version": "2020-07-10",
    "Statement": [
    {
      "Sid": "PublicReadForGetTestBucketObjects",
      "Effect": "Allow",
      "Principal": {
        "AWS": "*"
```

-continued

```
        },
        "Action": "s3:GetObject",
        }
      }
    ]
  }
  EOF
}
```

The "policy=<<EOF . . . EOF" syntax specifies a here document syntax for the example IaC resource 404. The "Version" field specifies a date for the version the resource is configured to run on, and the "Statement" field followed by square brackets specifies the section of the example IaC resource 404 corresponding to a security policy. The "Sid" field is an identifier, the "Effect" field specifies that the policy is to allow the given action, the "Principal" field followed by braces specifies that the policy applies to all AWS S3 resources, and the "Action" field specifies that the allowed action is to access S3 instances.

Figure 5:
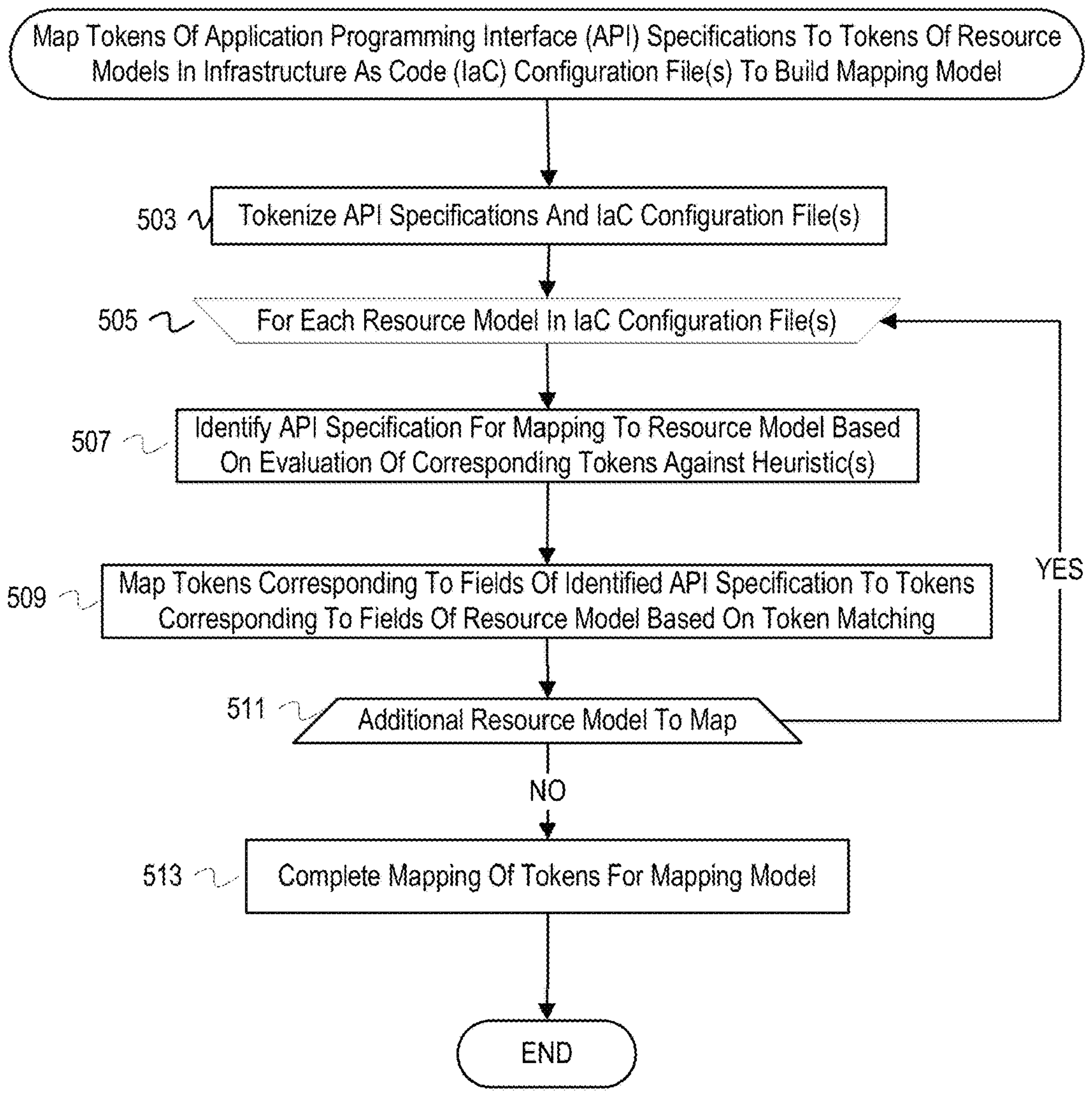
FIG. 5 is a flowchart of example operations to map tokens of API specifications to tokens of resource models defined in IaC configuration files to build a mapping model.

FIG. 5 is a flowchart of example operations to map tokens of API specifications to tokens of resource models defined in IaC configuration files to build a mapping model. Before a security policy rule can be converted from runtime to buildtime, token mapping is determined. With the mapping model, a runtime query for a security policy rule can be applied to an IaC resource(s) indicated in the runtime query. The example operations of FIG. 5 are described as being performed by a token mapper for consistency with the earlier figures.

At block 503, a token mapper tokenizes API specifications and IaC configuration files. The token mapper will parse and tokenize the API specifications and IaC configuration files according to parsing and token generation rules that specify delimiters, character clean up, etc. The token mapper can identify tokens of fields based on delimiters and locations (e.g., colons and new lines). The API specifications are those of a cloud environment into which resources will be provisioned according to the IaC configuration files. The token mapper is programmed to distinguish between verb tokens and non-verb tokens based on rules (e.g., distinguishing based on token location relative to specified delimiters) and/or a token glossary.

At block 505, the token mapper iteratively processes each resource model defined in the IaC configuration file(s). The token mapper identifies each resource model based on hierarchical arrangement in the configuration file and delimiters. For instance, the token mapper can identify a resource model as a section of code conforming to a specified format (e.g., token preceding outermost braces). The token mapper can traverse a configuration file from file beginning to file ending and process each resource model as encountered.

At block 507, the token mapper identifies one of the API specifications for mapping to the resource model based on evaluation of corresponding tokens against a heuristic(s). The heuristic specifies one or more criterion or condition to satisfy to be a "most appropriate" API specification for the resource model. As an example, the heuristic may indicate a floor amount of token matching based on longest common string matching and identify the most appropriate API specification as the one with the greatest amount of non-verb token matching based on longest common string and that exceeds the floor amount. The matching can be quantified as number of matching tokens and/or percentage of the resource model matched or "covered" by the non-verb tokens of the API specification. The heuristic(s) for matching also indicate rules for matching. Heuristics can indicate matching despite variations in capitalization, punctuation, etc. For instance, heuristics match tokens despite differences from different case types (e.g., camel case, Pascal case, etc.). Embodiments can define the matching rules separately from the heuristic. Prior to token matching based selection, the token mapper can first select a set of candidate API specifications based on similarity of names of the IaC configuration file and the API specifications.

At block 509, the token mapper maps tokens corresponding to fields of the identified API specification to tokens corresponding to fields of the resource model based on token matching. After identifying the most appropriate API specification, the token mapper associates or maps non-verb tokens of the identified API specification to the matching non-verb tokens of the resource model. As stated earlier, the token matching accommodates variations as indicated in token matching rules. Likewise, the token mapper maps verb tokens of the API specification to verb tokens of the resource model according to verb token matching.

At block 511, the resource mapper determines whether there is an additional resource model map. For instance, the resource mapper determines whether it has reached an end of file of the last IaC configuration file being processed for mapping. If there is an additional resource model to map, then operational flow continues to block 505. Otherwise, operational flow proceeds to block 513.

At block 513, the mapping of tokens between the API specifications and the IaC configuration files is completed. Together, the mappings across API specifications and IaC resource models can be considered a mapping model. However, some may consider each set of mappings for each API specification to be a mapping model. Regardless, the mappings can be completed manually.

Figure 6:
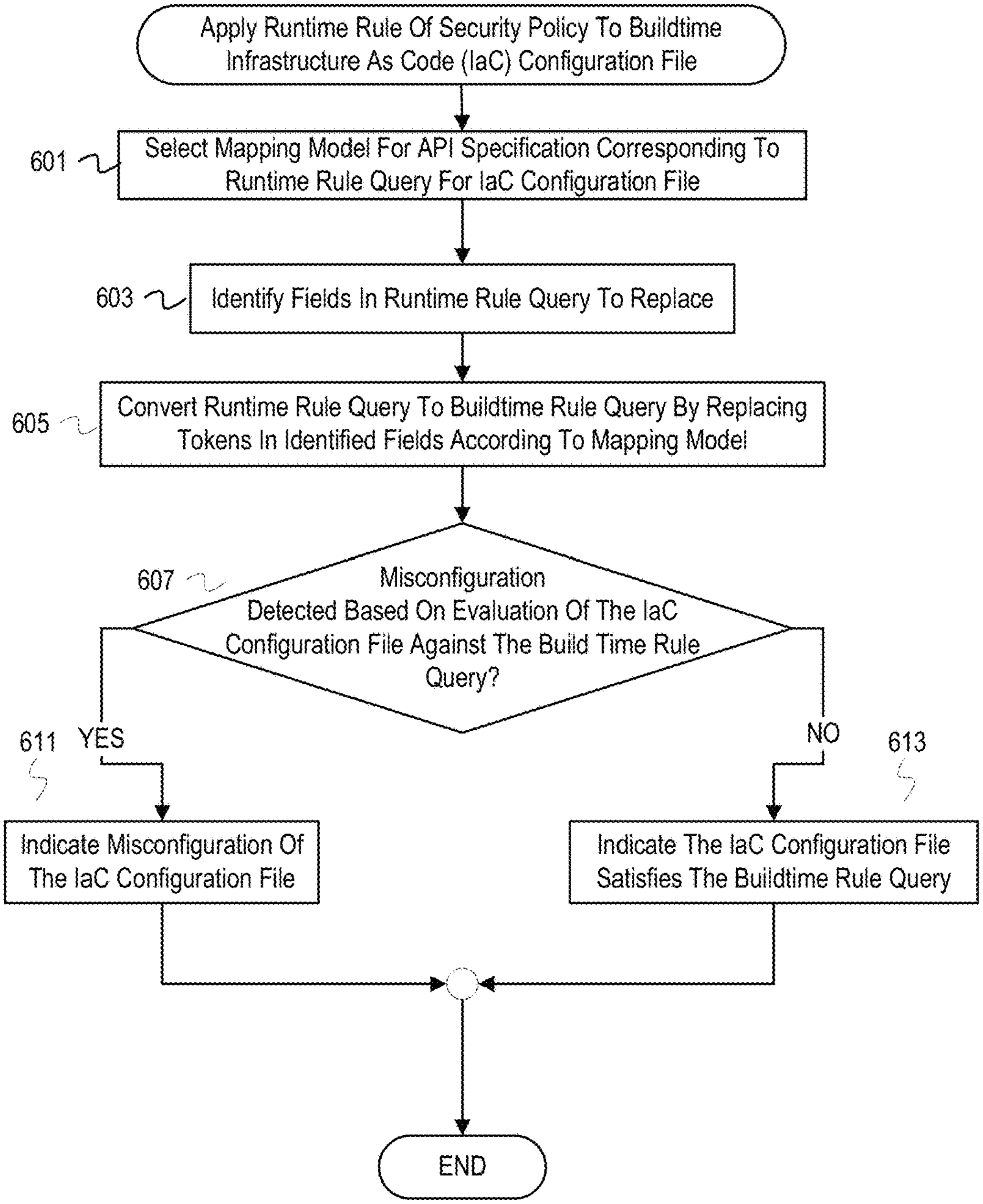
FIG. 6 is a flowchart of example operations for applying a runtime rule of a security policy to a buildtime IaC configuration file.

FIG. 6 is a flowchart of example operations for applying a runtime rule of a security policy to a buildtime IaC configuration file. Applying a security policy rule may be implemented with a query. This runtime rule query will be converted into buildtime rule query with the mapping model created for the IaC and a relevant API specification as indicated in the runtime query. For consistency with the earlier figures, the description for FIG. 6 refers to a policy mapper as performing the example operations.

At block 601, a policy mapper selects a mapping model for the API specification corresponding to a runtime rule query for an IaC configuration file. The runtime query will indicate an API specification. The policy mapper can select a mapping model that was created for the API specification or that was created for multiple API specifications including the API specification. The mapping model can be associated with metadata that indicates API specifications represented in the mapping model. The IaC configuration file may be specified in the runtime rule query or may be specified in a command line, for example, into which the runtime rule query is being executed or invoked.

At block 603, the policy mapper identifies fields in the runtime rule query to replace. The policy mapper can identify the fields to substitute based on the runtime rule query satisfying a defined format for the query.

At block 605, the policy mapper converts the runtime rule query to a buildtime rule query by replacing tokens in the identified fields according to the mapping model. The policy mapper will traverse the identified fields. At each field, the policy mapper accesses the mapping model with the token that populates the field and replaces that token ("runtime token") with the IaC token that maps to the runtime token. If a match cannot be found, the field can be marked for review or a notification generated for manual intervention.

At block 607, the policy mapper (or another process/executing code unit) determines whether the IaC configuration file is misconfigured based on evaluating the IaC configuration file against the buildtime rule query. With the runtime tokens replaced with IaC tokens, the rule query can be applied to determine whether the IaC configuration file violates the security policy rule, which would be considered a misconfiguration. If a misconfiguration is detected, then operational flow proceeds to block 611. If a misconfiguration is not detected, then operational flow proceeds to block 613.

At block 611, the policy mapper indicates a misconfiguration of the IaC configuration file. The policy mapper can generate a notification and the notification may identify a specific rule violated, assuming the buildtime rule query encompassed multiple rules of the security policy. If the buildtime rule query is evaluated against multiple IaC configuration files, then the notification can specify which of the files violates the security policy.

At block 613, the policy mapper can generate a notification that the IaC configuration file satisfies the buildtime rule query. For instance, a graphical user interface can be updated with a color, message, and/or icon indicating that the IaC configuration file satisfies the security policy.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
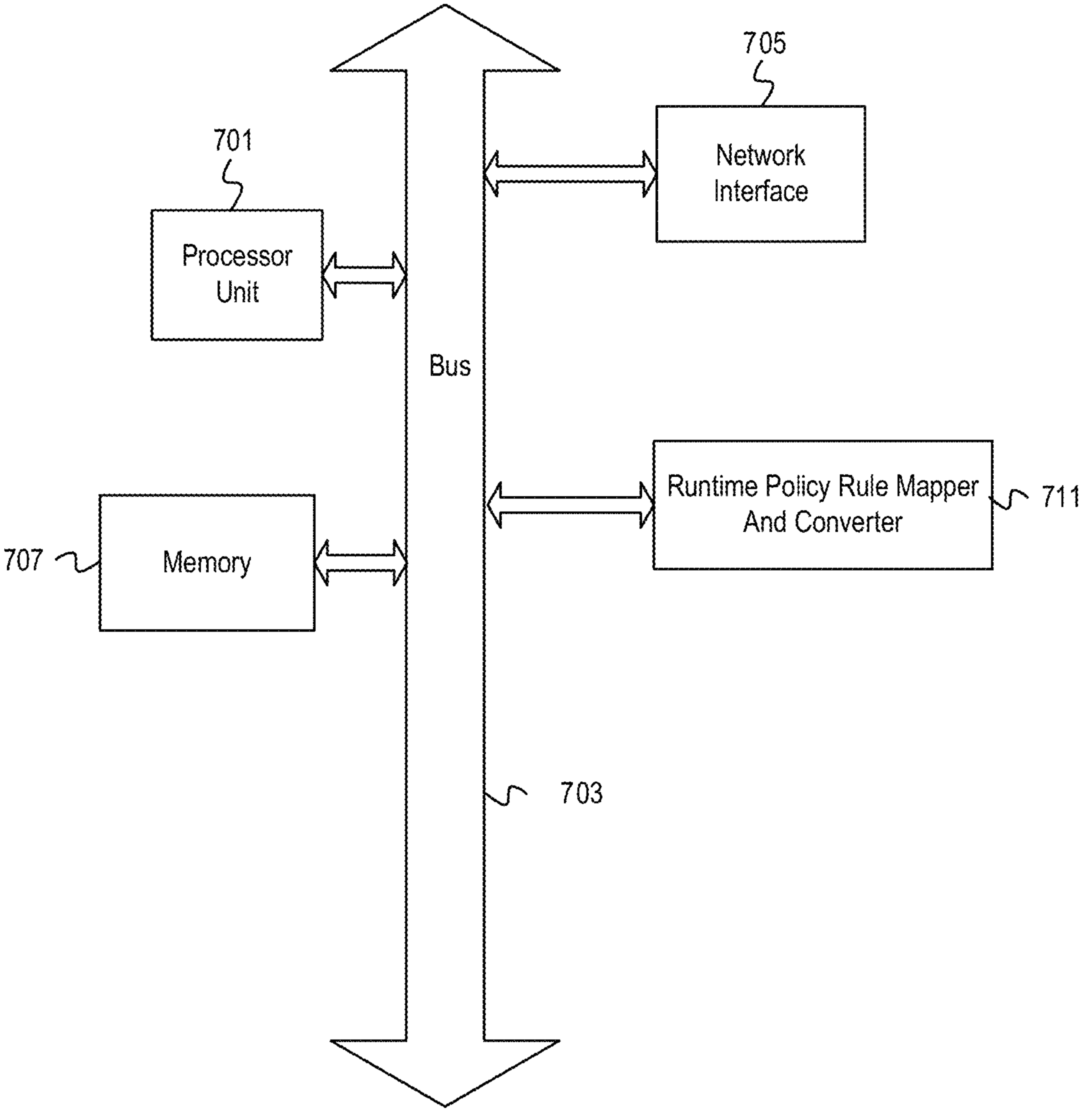
FIG. 7 depicts an example computer system with a runtime policy rule converter.

FIG. 7 depicts an example computer system with a runtime policy rule converter. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a runtime policy rule mapper/converter 711. The runtime policy rule mapper/converter 711 can tokenize runtime policy rules, map the tokens to tokens for an IaC resource according to a mapping index, and convert a runtime rule query into a buildtime rule query as described variously above. In addition, the runtime policy rule mapper/converter 711 builds a mapping model as described earlier. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 803, the memory 707 may be coupled to the processor 701.

The invention claimed is:

1. A method comprising:

tokenizing a plurality of application programming interface (API) specifications and a set of one or more infrastructure as code (IaC) configuration files;

for at least a first resource model in the set of IaC configuration files, identifying which of the plurality of API specifications satisfies a mapping criterion;

for each of the plurality of API specifications that satisfies the mapping criterion, mapping tokens of the API specification to tokens of the first resource model according to token matching rules; and generating, with the token mappings, a mapping model.

2. The method of claim 1 further comprising converting a security-related runtime rule query to a buildtime rule query based, at least in part, on the mapping model.

3. The method of claim 1, further comprising identifying verb tokens and non-verb tokens of the plurality of API specifications tokens and of the IaC configuration files tokens, wherein the token matching is among non-verb tokens and separately among verb tokens.

4. The method of claim 1, wherein identifying which of the plurality of API specifications satisfies the mapping criterion comprises determining which of the plurality of API specifications includes tokens that satisfy a matching amount criterion with respect to the tokens of the first resource model, wherein the mapping criterion specifies the matching amount criterion.

5. The method of claim 1, wherein mapping tokens, for each of the plurality of API specifications that satisfies the mapping criterion, to tokens of the first resource model comprises distinguishing between non-verb tokens and verb tokens with natural language processing and mapping non-verb tokens of the API specification to non-verb tokens of the first resource model and map verb tokens of the API specification to verb tokens of the first resource model.

6. The method of claim 1, further comprising identifying each resource model in each of the set of IaC configuration files.

7. The method of claim 6, further comprising:

for each identified resource model, evaluating at least a subset of the plurality of API specifications against the mapping criterion with respect to the identified resource model to identify the one of the subset of API specifications that satisfies the mapping criterion for the identified resource model; and mapping tokens of the identified API specification to tokens of the resource model according to token matching rules, wherein generating the mapping comprises generating the mapping also with the mappings of tokens of the identified API specifications to tokens of the corresponding one of the resource models.

8. A non-transitory, computer-readable medium having program code stored thereon, the program code comprising instructions to:

tokenize a plurality of application programming interface (API) specifications and a set of one or more infrastructure as code (IaC) configuration files;

for at least a first resource model in the set of IaC configuration files and a first of the plurality of API specifications, map tokens of the first API specification to tokens of the first resource model according to token matching rules; and generate, with the token mappings, a mapping model.

9. The non-transitory, computer-readable medium of claim 8, wherein the program code further comprises instructions to convert a runtime rule query to a buildtime rule query based, at least in part, on the mapping model.

10. The non-transitory, computer-readable medium of claim 8, wherein the instructions to tokenize the plurality of API specifications is according to syntax of the plurality of API specifications.

11. The non-transitory, computer-readable medium of claim 8, wherein the program code further comprises instructions to identify verb tokens and non-verb tokens of the plurality of API specifications tokens and of the IaC configuration files tokens, wherein the token matching is among non-verb tokens and separately among verb tokens.

12. The non-transitory, computer-readable medium of claim 8, wherein the program code further comprises instructions to determine that the tokens of the first API specification satisfy a matching amount criterion with respect to the tokens of the first resource model, wherein the instructions to map comprise the instructions to map based on determination that the matching amount criterion is satisfied.

13. The non-transitory, computer-readable medium of claim 12, wherein the matching amount criterion comprises one of a percentage of non-verb tokens matched between an API specification and a resource model, a threshold number of matching non-verb tokens, and a percentage of non-verb tokens of a resource model matched to non-verb tokens of an API specification.

14. The non-transitory, computer-readable medium of claim 8, wherein the program code further comprises instructions to:

for at least the first resource model, select a subset of the plurality of API specifications based on file names of the subset of API specifications satisfying a matching criterion with respect to a file name of a first of the set of IaC configuration files that includes the first resource model; and evaluate tokens of each of the subset of API specifications against a mapping criterion with respect to the tokens of the first resource model, wherein the subset of API specifications includes the first API specification, wherein the mapping criterion indicates an amount of token matching sufficient for mapping.

15. The non-transitory, computer-readable medium of claim 8, wherein the instructions to map tokens of the first API specification to tokens of the first resource model comprise instructions to distinguish between non-verb tokens and verb tokens with a natural language processor and map non-verb tokens of the first API specification to non-verb tokens of the first resource model and map verb tokens of the first API specification to verb tokens of the first resource model.

16. The non-transitory, computer-readable medium of claim 8, wherein the token matching rules account for differences in at least syntax and capitalization between the plurality of API specifications and the set of one or more IaC configuration files.

17. The non-transitory, computer-readable medium of claim 8, wherein the program code further comprises instructions to identify each resource model in each of the set of IaC configuration files.

18. The non-transitory, computer-readable medium of claim 17, wherein the program code further comprises instructions to:

for each identified resource model, evaluate at least a subset of the plurality of API specifications against a mapping criterion with respect to the identified resource model to identify the one of the subset of API specifications that satisfies the mapping criterion for the identified resource model, wherein the mapping criterion indicates an amount of token matching sufficient for mapping; and map tokens of the identified API specification to tokens of the resource model according to token matching rules, wherein the instructions to generate the mapping model comprise the instructions to generate the mapping model also with the mappings of tokens of the identified API specifications to tokens of the corresponding one of the resource models.

19. An apparatus comprising:

a processor; and a computer-readable medium having instructions stored thereon that are executable by the processor to cause the apparatus to, tokenize a plurality of application programming interface (API) specifications and a set of one or more infrastructure as code (IaC) configuration files;

for at least a first resource model in the set of IaC configuration files and a first of the plurality of API specifications, map tokens of the first API specification to tokens of the first resource model according to token matching rules; and generate, with the token mappings, a mapping model.

20. The apparatus of claim 19, wherein the computer-readable medium further has stored thereon instructions to convert a runtime rule query to a buildtime rule query based, at least in part, on the mapping model.

* * * * *